United States Patent
Wang et al.

(10) Patent No.: US 11,789,308 B2
(45) Date of Patent: Oct. 17, 2023

(54) MODULE STRUCTURE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Boning Wang, Beijing (CN); Jian Ren, Beijing (CN); Xiaoping Zhang, Beijing (CN); Site Cai, Beijing (CN); Yangli Zheng, Beijing (CN); Hang Xia, Beijing (CN); Huaxu Yang, Beijing (CN); Naiqi Men, Beijing (CN); Yaodong Wang, Beijing (CN); Luo Zhang, Beijing (CN); Mang Fu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 154 days.

(21) Appl. No.: 17/459,714

(22) Filed: Aug. 27, 2021

(65) Prior Publication Data
US 2022/0187659 A1    Jun. 16, 2022

(30) Foreign Application Priority Data
Dec. 11, 2020   (CN) .......................... 202011459065.4

(51) Int. Cl.
G02F 1/13357    (2006.01)
G02F 1/1333     (2006.01)
F21V 8/00       (2006.01)
G02F 1/135      (2006.01)

(52) U.S. Cl.
CPC ..... *G02F 1/133603* (2013.01); *G02B 6/0028* (2013.01); *G02B 6/0068* (2013.01); *G02B 6/0073* (2013.01); *G02F 1/133305* (2013.01); *G02F 1/133331* (2021.01); *G02F 1/1351* (2021.01)

(58) Field of Classification Search
CPC ......... G02F 1/133603; G02F 1/133331; G02F 1/133305; G02F 1/1351; G02B 6/0028; G02B 6/0068; G02B 6/0073
See application file for complete search history.

(56) References Cited

U.S. PATENT DOCUMENTS

2011/0255303 A1* 10/2011 Nichol ................. G02B 6/0053
362/606
2012/0293724 A1* 11/2012 Ueyama ............... G02B 6/0083
362/249.02

FOREIGN PATENT DOCUMENTS

CN    104991378 A  * 10/2015  ........... G02B 6/0026
CN    105527749 A  *  4/2016  ........ G02F 1/133603

* cited by examiner

*Primary Examiner* — Mary Ellen Bowman
(74) *Attorney, Agent, or Firm* — IPRO, PLLC

(57) ABSTRACT

A module structure and a display device are disclosed. The module structure includes a backlight sheet, a display screen, and a glass cover which are stacked, and further includes a light guide plate, LED lights, and a flexible circuit board disposed between the display screen and the glass cover, the LED lights are located on a side of the light guide plate facing away from a display area, and the LED lights are electrically connected to the flexible circuit board.

20 Claims, 3 Drawing Sheets

MODULE STRUCTURE AND DISPLAY DEVICE

CROSS REFERENCE TO RELATED APPLICATIONS

The present disclosure claims priority to Chinese Patent Application No. 202011459065.4, filed with the Chinese Patent Office on Dec. 11, 2020, the content of which is hereby incorporated by reference in its entirety.

FIELD

The present disclosure relates to the field of display technology, and particularly to a module structure and a display device.

BACKGROUND

There is no flash lamp in the surrounding area of the display screen of the existing mobile phone due to space limitation, and consequently the mobile phone cannot take a clear picture when a selfie is taken in a dark environment. In order to take the selfie in the dark environment, the following light supplementation solution exists at present: when a person takes the selfie by the mobile phone, a selfie start signal is inputted into the mobile phone by triggering a hardware key or a touch pad, an infrared IR photosensitive device of the mobile phone detects ambient light, and if the ambient light is detected below a, then a processor turns on all the pixels of the display screen to achieve the highest transmission mode, and then a momentary high current is outputted to the backlight LED light (twice regular supply current under the limiting condition) to achieve the brightest white picture of the display screen. The light of the screen is casted to the person and the surrounding environment, the selfie is taken after the signal is inputted into a front camera, and after the selfie is completed, all settings are reset and the screen is restored to the normal display interface.

However, the above solution results in low light supplementation brightness due to the only twice regular supply current under the limiting condition, and the momentary high current may reduce the lifetime of the LED light, high power consumption occurs due to an additional supply current, and a delayed selfie speed happens due to excitation of a plurality of signals.

SUMMARY

The present disclosure provides a module structure including a backlight sheet, a display screen, and a glass cover which are stacked, further including a light guide plate, LED lights, and a flexible circuit board disposed between the display screen and the glass cover, where the LED lights are located on a side of the light guide plate facing away from a display area, and the LED lights are electrically connected to the flexible circuit board.

The present disclosure further provides a display device including the above-described module structure.

Figure 1:
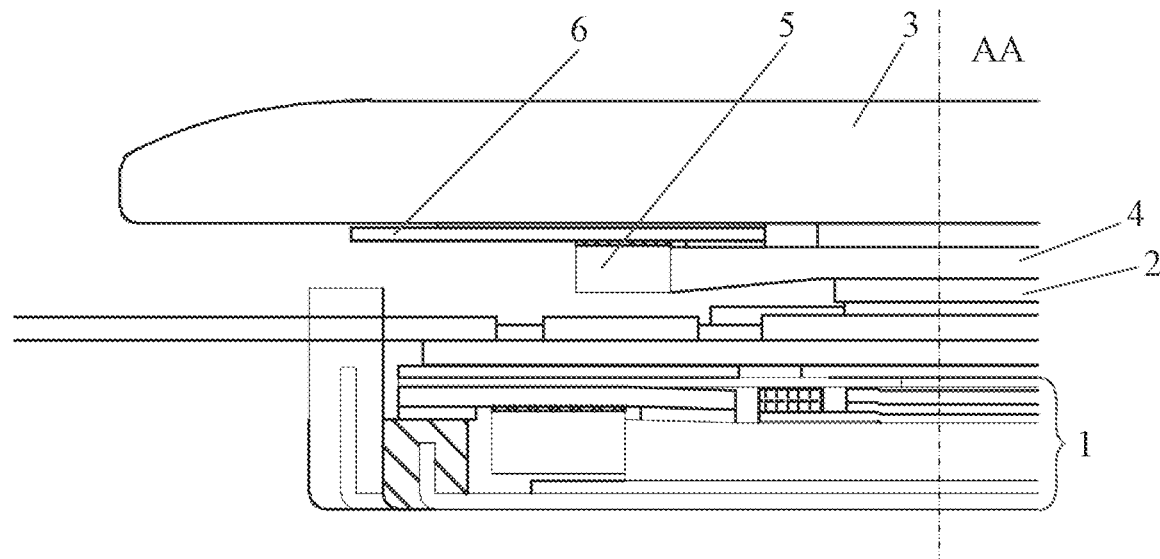
FIG. 1 is a schematic structural diagram illustrating a module structure according to an embodiment of the present disclosure.

In the drawings: 1—backlight sheet; 2—display screen; 3—glass cover; 4—light guide plate; 41—body portion; 42—wedge portion; 421—light-blocking layer; 5—LED light; 51—red LED light; 52—green LED light; 53—blue LED light; 6—flexible circuit board; 7—transparent optical tape; 8—light bar glue.

DETAILED DESCRIPTION

The technical solutions in embodiments of the present disclosure will be clearly and fully described below in connection with the accompanying drawings in embodiments of the present disclosure, and it will be apparent that the described embodiments are only some, but not all, embodiments of the present disclosure. Based on embodiments in the present disclosure, all other embodiments obtained by those of ordinary skill in the art without making inventive effort are within the scope of protection of the present disclosure.

Referring to FIG. 1, the present disclosure provides a module structure including a backlight sheet 1, a display screen 2, and a glass cover 3 which are stacked, further including a light guide plate 4, LED lights 5, and a flexible circuit board 6 disposed between the display screen 2 and the glass cover 3. The LED lights 5 are located on a side of the light guide plate 4 facing away from a display area, and LED lights 5 are electrically connected to the flexible circuit board 6.

Figure 6:
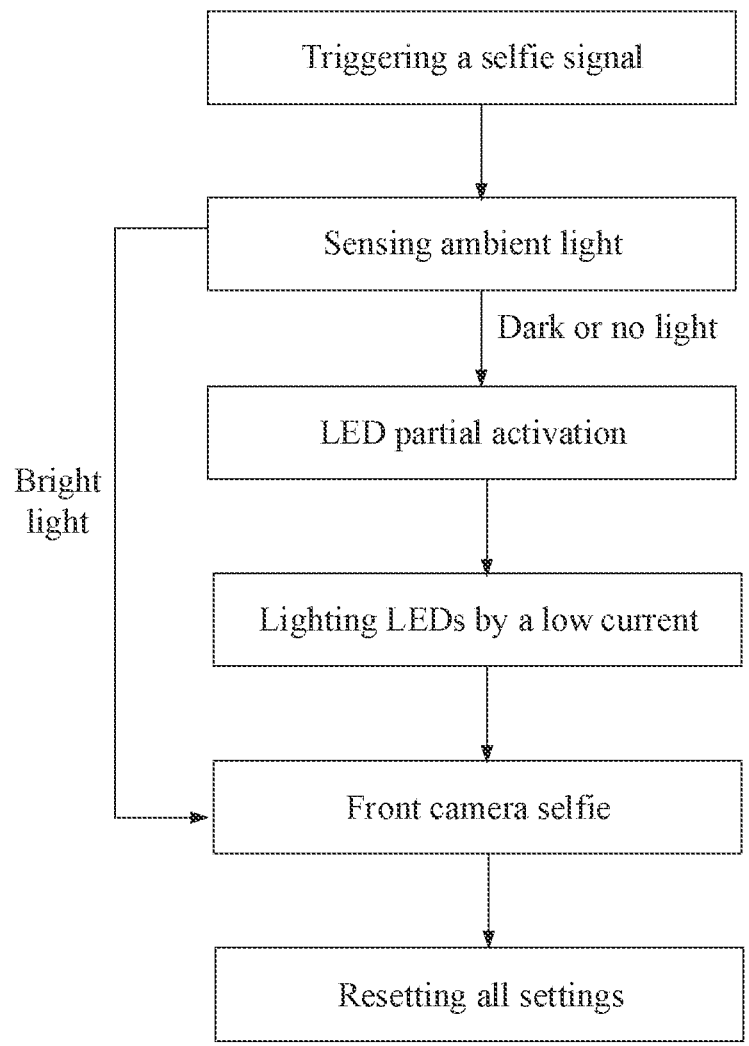
FIG. 6 is a schematic diagram illustrating a principle of a control signal when the LED lights are used according to an embodiment of the present disclosure.

In the module structure, the light guide plate 4 and the LED lights 5 are arranged between the display screen 2 and the glass cover 3, on one hand, since the LED lights 5 are arranged in a non-display area, the light guide plate 4 and the LED lights 5 do not affect the screen ratio, normal display is achieved, on the other hand, in combination with FIG. 6, time-sharing circuits of the LED lights 5 are synchronized, when the selfie signal is triggered to sense ambient light, under the condition where light supplementation is desired, the LED lights 5 are energized with a low current, after the LED lights 5 emit light, the line light source is converted into a flat light source through the light guide plate 4 and the light is emitted from a glass substrate to illuminate the selfie environment, thus achieving a clear selfie picture. Since the LED lights 5 are illuminated by the low current, for example, the required brightness is 1800 nits (three times higher than that of the original structure), the power consumption of the LED lights 5 may be reduced to one sixth of the original (the original backlight brightness is 10400 nit), and the current is reduced to one sixth of the original, the lifetime of the LED lights 5 can be increased, and the power consumption is low.

Therefore, the module structure of the present disclosure not only guarantees normal display without delay of selfie, but also improves brightness, increases the lifetime of the LED lights 5, and reduces power consumption.

Figure 2:
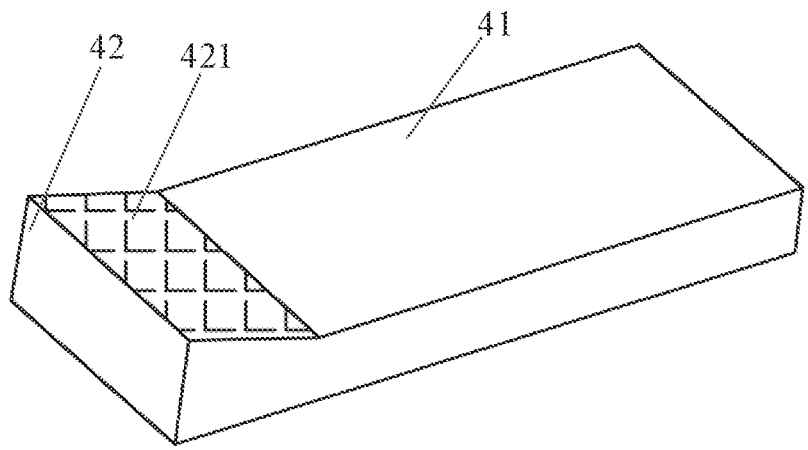
FIG. 2 is a schematic structural diagram illustrating a light guide plate according to an embodiment of the present disclosure.

In an embodiment, as shown in FIG. 2, the light guide plate 4 includes a body portion 41 and a wedge portion 42, the body portion 1 is disposed in parallel between the display screen 2 and the glass cover 3, the wedge portion 42 is located on a side of the body portion 41 facing away from the display area, the wedge portion 42 gradually decreases in thickness in a direction from the wedge portion 42 to the body portion 41, and the LED lights 5 are mounted on a side of the wedge portion 42 facing away from the body portion 41. By mounting the LED lights 5 on one end of the wedge portion 42, the above wedge structure not only increases the light exit area of the LED lights 5 but also increases the mounting robustness of the LED lights 5.

On this basis, the side of the wedge portion 42 facing the glass cover 3 is parallel to the glass cover 3 and the side of the wedge portion 42 facing the display screen 2 is an inclined plane, i.e. the wedge portion 42 is in an inverted structure, through the inverted structural design of the light guide plate, not only the structural strength can be increased, but also the interference problem of the thickness of the wedge portion 42 to the overall module structure is also solved, thus guaranteeing that the module structure is not affected.

In some embodiments, the side of the wedge portion 42 facing the display screen 2 has a light-blocking layer 421 that prevents light rays from exiting from the side of the wedge portion 42 facing the display screen 2 to affect vision, thereby reducing difficulty in adjusting the light effect and increasing the surface uniformity of the light. It should be noted that the material of the light-blocking layer 421 described above may be black ink, which is convenient for implementation and is advantageous for reducing cost.

Further, on the basis of the above-described structure in which the light guide plate 4 includes the body portion 41 and the wedge portion 42, a thickness of the body portion 41 is in a range of 0.2 mm to 0.3 mm. Because the thickness of the body portion 41 is small, it is possible to convert the LED lights 5 from a line light source into a flat light source and the flat light source may be emitted from the glass cover 3, and the thickness of the overall module structure is not significantly increased, thus facilitating the thin design of the module structure.

On this basis, a thickness of the side of the wedge portion 42 on which the LED lights are mounted is in a range of 0.3 mm to 0.4 mm, and a distance between the side of the wedge portion 42 on which the LED lights are mounted and a border of the display area is 0.45 mm. The distance may ensure that the mounting site of the LED lights 5 avoids the display area so as not to affect the normal display.

It should be noted that the thickness of the side of the wedge portion 42 on which the LED lights are mounted may be adapted to the thickness dimension of the LED lights 5 to better increase structural strength and also to improve display effectiveness.

Figure 3:
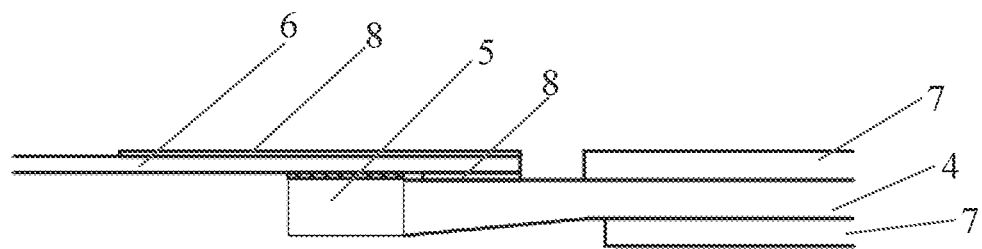
FIG. 3 a schematic structural diagram illustrating the light guide plate assembled with LED lights according to an embodiment of the present disclosure.

It should also be noted that, as shown in FIGS. 1 and 3, the above-mentioned light guide plate 4 may be mounted between the display screen 2 and the glass cover 3 by adhesive bonding, where the side of the light guide plate 4 facing the display screen 2 is bonded to the display screen 2 using a transparent optical tape 7 and the side of the light guide plate 4 facing the glass cover 3 is bonded to the glass cover 3 using a transparent optical tape 7. Furthermore, the flexible circuit board 6 may also be fixed to the side of the glass cover 3 facing the display screen 2 by adhesive bonding. In some embodiments, the flexible circuit board 6 may be fixed to the glass cover 3 and the light guide plate 4 using light bar glue 8, thereby ensuring the temperature properties of the LED lights 5.

Figure 4:
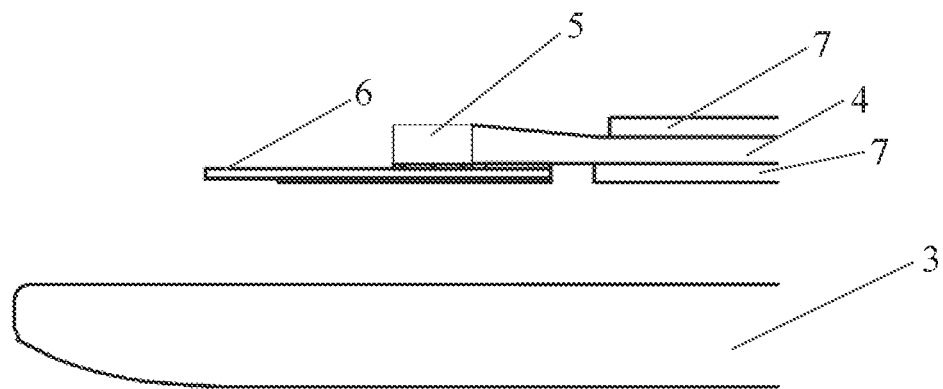
FIG. 4 is a schematic structural diagram illustrating the light guide plate assembled with a glass cover after being assembled with the LED lights according to an embodiment of the present disclosure.

Taking the above structure and bonding approach as an example, in conjunction with FIG. 1, FIG. 3 and FIG. 4, the manufacturing process of the light guide plate 4 and the LED lights 5 added in the present disclosure is illustrated: firstly, both sides of the light guide plate 4 are fitted with the transparent optical tape 7, respectively, at the same time the LED lights 5 are assembled with the flexible circuit board 6, then the LED lights 5 are fixed to one side of the light guide plate 4 with the light bar glue 8, then the light guide plate 4 assembly is fitted with the glass cover 3, where the glass cover 3 may be placed underneath to ensure the fitted flatness, and finally the fitted glass cover 3, light guide plate 4 and LED lights 5 are fitted with the display screen 2 to complete the assembly.

Figure 5:
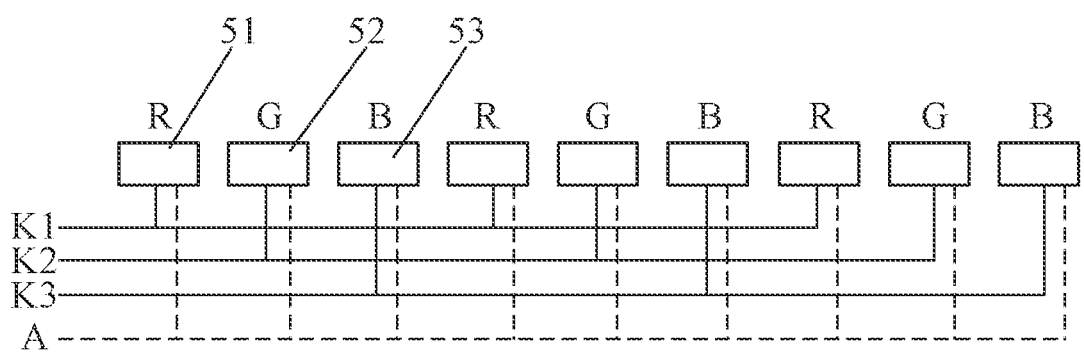
FIG. 5 is a schematic structural diagram illustrating the LED lights according to an embodiment of the present disclosure.

In an embodiment, as shown in FIG. 5. K1, K2, and K3 are negative electrodes, A is the positive electrode, and the LED lights 5 in the present disclosure may include a plurality of red LED lights 51, a plurality of blue LED lights 53 and a plurality of green LED lights 52, and the LED lights 5 of each color are electrically connected to the flexible circuit board 6 and may be controlled by a host to achieve light supplementation of different colors, for example, bluish supplementation for yellow skin and yellowish supplementation for white skin.

Based on the same inventive idea, the present disclosure may further provide a display device including a module structure in any embodiment of the present disclosure, the display device in the present disclosure has good user experience since the module structure may guarantee a normal display while also increasing brightness during selfie, increasing the lifetime of the LED lights, and reducing power consumption.

It will be apparent to those skilled in the art that various modifications and variations can be made to embodiments of the present disclosure without departing from the spirit and scope of the disclosure. Thus, it is intended that the present disclosure include such modifications and variations provided they come within the scope of the present claims and their equivalents.

What is claimed is:

1. A module structure, comprising a backlight sheet, a display screen, and a glass cover which are stacked sequentially, further comprising a light guide plate, LED lights, and a flexible circuit board disposed between the display screen and the glass cover, wherein the LED lights are located on a side of the light guide plate facing away from a display area, and the LED lights are electrically connected to the flexible circuit board.

2. The module structure according to claim 1, wherein the light guide plate comprises a body portion and a wedge portion, the body portion is disposed in parallel between the display screen and the glass cover, the wedge portion is located on a side of the body portion facing away from the display area, the wedge portion gradually decreases in thickness in a direction from the wedge portion to the body portion, and the LED lights are mounted on a side of the wedge portion facing away from the body portion.

3. The module structure according to claim 2, wherein a side of the wedge portion facing the glass cover is parallel to the glass cover and a side of the wedge portion facing the display screen is a bevel.

4. The module structure according to claim 3, wherein the side of the wedge portion facing the display screen has a light-blocking layer.

5. The module structure according to claim 4, wherein a material of the light-blocking layer is black ink.

6. The module structure according to claim 2, wherein a thickness of the body portion is in a range of 0.2 mm to 0.3 mm.

7. The module structure according to claim 2, wherein a thickness of the side of the wedge portion on which the LED lights are mounted is in a range of 0.3 mm to 0.4 mm, and a distance between the side of the wedge portion on which the LED lights are mounted and a border of the display area is 0.45 mm.

8. The module structure according to claim 1, wherein the light guide plate is bonded between the display screen and the glass cover.

9. The module structure according to claim 1, wherein the LED lights comprise a plurality of red LED lights, a plurality of blue LED lights and a plurality of green LED lights, the red LED lights, the blue LED lights, and the green LED lights are electrically connected to the flexible circuit board.

10. The module structure according to claim 1, wherein the flexible circuit board is bonded between the glass cover and the light guide plate.

11. A display device, comprising a module structure, the module structure comprising a backlight sheet, a display screen, and a glass cover which are stacked sequentially, the module structure further comprising a light guide plate, LED lights, and a flexible circuit board disposed between the display screen and the glass cover, wherein the LED lights are located on a side of the light guide plate facing away from a display area, and the LED lights are electrically connected to the flexible circuit board.

12. The display device according to claim 11, wherein the light guide plate comprises a body portion and a wedge portion, the body portion is disposed in parallel between the display screen and the glass cover, the wedge portion is located on a side of the body portion facing away from the display area, the wedge portion gradually decreases in thickness in a direction from the wedge portion to the body portion, and the LED lights are mounted on a side of the wedge portion facing away from the body portion.

13. The display device according to claim 12, wherein a side of the wedge portion facing the glass cover is parallel to the glass cover and a side of the wedge portion facing the display screen is a bevel.

14. The display device according to claim 13, wherein the side of the wedge portion facing the display screen has a light-blocking layer.

15. The display device according to claim 14, wherein a material of the light-blocking layer is black ink.

16. The display device according to claim 12, wherein a thickness of the body portion is in a range of 0.2 mm to 0.3 mm.

17. The display device according to claim 12, wherein a thickness of the side of the wedge portion on which the LED lights are mounted is in a range of 0.3 mm to 0.4 mm, and a distance between the side of the wedge portion on which the LED lights are mounted and a border of the display area is 0.45 mm.

18. The display device according to claim 11, wherein the light guide plate is bonded between the display screen and the glass cover.

19. The display device according to claim 11, wherein the LED lights comprise a plurality of red LED lights, a plurality of blue LED lights and a plurality of green LED lights, the red LED lights, the blue LED lights, and the green LED lights are respectively electrically connected to the flexible circuit board.

20. The display device according to claim 11, wherein the flexible circuit board is bonded between the glass cover and the light guide plate.

* * * * *